United States Patent [19]

Ikariya et al.

[11] Patent Number: 4,834,310
[45] Date of Patent: May 30, 1989

[54] PHOTOGRAPHIC FILM SPOOL

[75] Inventors: Toshiyuki Ikariya; Kiyohiko Takahashi; Osamu Shibazaki; Nori Sakamoto, all of Hino, Japan

[73] Assignee: Konica Corporation, Tokyo, Japan

[21] Appl. No.: 145,370

[22] Filed: Jan. 19, 1988

[30] Foreign Application Priority Data

Jan. 20, 1987 [JP] Japan ................ 62-6274[U]
Jan. 20, 1987 [JP] Japan ................ 62-6275[U]
Jan. 20, 1987 [JP] Japan ................ 62-6276[U]
Jan. 20, 1987 [JP] Japan ................ 62-6277[U]

[51] Int. Cl.[4] .............................. B65H 75/28
[52] U.S. Cl. .................................... 242/74
[58] Field of Search ............ 242/74, 74.1, 74.2, 242/71.8, 68.5, 71, 71.1, 71.2

[56] References Cited

U.S. PATENT DOCUMENTS

| | | | |
|---|---|---|---|
| 3,361,380 | 1/1968 | Mizutani | 242/74 |
| 3,383,069 | 5/1968 | Riedel et al. | 242/74 |
| 4,506,843 | 3/1985 | Luhrig et al. | 242/74 |
| 4,619,419 | 10/1986 | Essler | 242/107.4 A |

FOREIGN PATENT DOCUMENTS

| | | | |
|---|---|---|---|
| 566676 | 4/1958 | Belgium | 242/74 |
| 834693 | 5/1960 | United Kingdom | 242/74 |
| 863296 | 3/1961 | United Kingdom | 242/74 |

Primary Examiner—John M. Jillions
Attorney, Agent, or Firm—Jordan B. Bierman

[57] ABSTRACT

The invention provides a spool for winding a photographic roll film. The spool has a bar-shaped spool core which is slitted to lengthwise direction to form a slit for inserting a tongue-shaped end of the film having a through hole. On an inside wall of the slit, there is provided a catch claw capable of engaging the through hole. On another inside wall opposite to the above inside wall, there is provided a pressing rib for pressing and guiding the tongue-shaped end to the catch claw. A part of the outer surface of the spool core, adjoining to the inside wall of the slit in which is disposed the pressing rib, is shaped to serve as a film contact surface. The tip surface of the pressing rib and the film contact surface both jointly form a continuous shape of a circular arc.

8 Claims, 7 Drawing Sheets

PHOTOGRAPHIC FILM SPOOL

BACKGROUND OF THE INVENTION

This invention relates to a photographic film spool and particularly to a photographic film spool comprising a pass-through type slit provided at about the center of a spool core so that a tongue-shaped end of a film may be inserted through the slit and a means provided in the slit for catching the perforations on the tongue-shaped end of the film.

Figure 11:
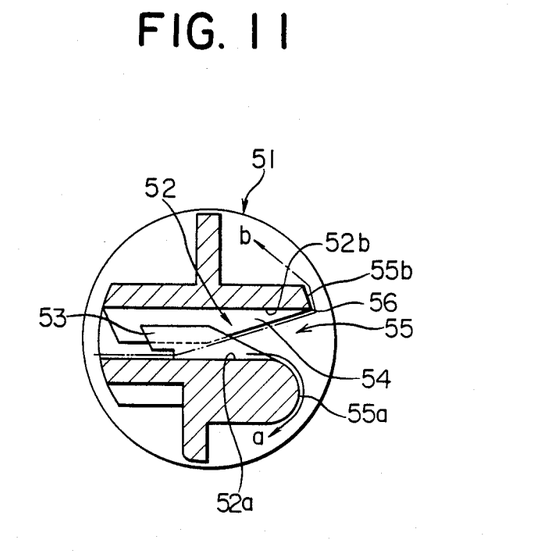
FIG. 11 and FIG. 13 show respectively conventional spools.

As shown in FIG. 11, photographic film spools of conventional type are generally composed of catch claws 53 which are arranged on one inner wall surface 52a of the slit 52 provided at about the center of spool core 51 and is capable of catching perforations on the tongue-shaped end of a film and composed of film pressure rib 54 provided on the other inner wall surface 52b. Edges of both catch claws 53 and pressure rib 54 are slanted linearly toward the rear of the slit. When the tongue-shaped end of a film is inserted into the slit 52 from the film inlet 55, the perforations on the tongue-shaped end of a film are engaged with catch claws 53 and after their engagement, the perforations are caught by the catch claws when the film is pulled out slightly in the opposite direction.

In spools of this type, a film caught by catch claws 53 is regularly wound up around film contact surface 55a adjoining smoothly the inner wall surface 52a of a slit provided with catch claws 53, as shown by a solid line with an arrow mark 'a'. Therefore, film contact surface 55a is shaped in a circular arc form so as not to bend any film to an acute angle. In contrast to the above, when the film is wound up in a regular manner, the film touches, after being wound around spool core 51 once, another film contact surface 55b adjoining the inner wall surface 52b of the slit provided with pressure rib 54. Therefore, as shown in the drawing, there may be no problem even if film contact surface 55b is so shaped stepwise as to form a sharp edge. However, when a film is erroneously wound up in the direction opposite to the regular winding direction as shown by a two-dot chain line with arrow mark 'b', the film is bent sharply at the intersecting point 56 of the slantingly-shaped film contact surface 55b and inner wall surface 52b of the slit. For example, after a film cartridge containing a film regularly wound up around a spool core is practically loaded into a camera and pictures are taken, there may be some occasions where the film rewinding handle of a camera is erroneously turned in the direction opposite to the regular winding direction when rewinding the film around the spool core. In addition to the above, if such a film rewinding is made at a low temperature such as in winter time, there is a risk that a breakage takes place on the portion of a film which contacts directly to aforesaid intersecting point 56.

This invention is to solve the above-mentioned problems.

It is, therefore, an object of the invention to provide a photographic film spool so devised as not to cause any risk of damaging films even in case that a film is reversely wound up around a spool core at a substantially low temperature.

Figure 13:
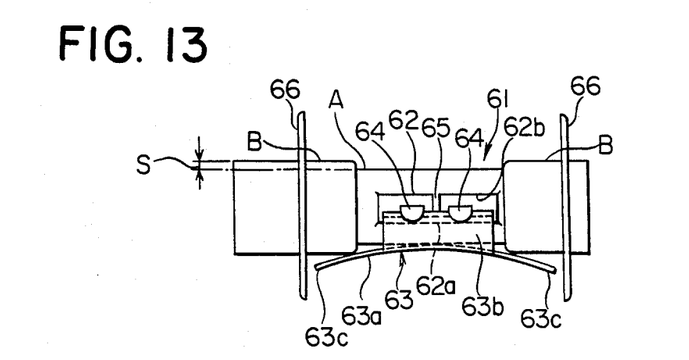

In the conventional spool, as shown in FIG. 13, the radius of the spool core portion A forming slit 62 is smaller than that of circumferential portion B inside of flanges 66 and 66, which has caused a big step S formed on a boundary zone between both portions mentioned above. Therefore, when the film 63 is wound around spool core 61 after the tongue-shaped end 63b of the film 63 is caught in slit 62, the tongue-shaped end 63b is wound around the portion A where the slit is formed, while, the main portion of the film 63 following the tongue-shaped end 63b is wound around the circumferential portion B whose radius is greater. Consequently, the film 63 is deformed as shown in the figure, being affected by aforesaid step S, and both corners 63c and 63c of the film end 63a are lifted, which has caused a risk that the emulsion side of the film wound around the spool once is scratched by aforesaid both corners 63c and 63c.

The present invention is for solving aforesaid problems and its object is to provide a photographic film spool whose spool core enables a film to be wound around the spool without being deformed.

SUMMARY OF THE INVENTION

In order to provide a photographic film spool causing no risk of film damage despite an occasion wherein a film is wound reversely around the spool core under the condition of a low temperature, the present invention is characterized in that a through type slit capable of taking in the tongue-shaped end of film is provided at about the center of the spool core of the spool, catch claws capable of catching holes on the tongue-shaped end of film are provided on an inner wall surface at one side of the slit, a film pressure rib is provided on an inner wall surface at the other side of the slit, and the surface of the outer edge at the film insertion side on aforesaid film pressure rib and the film contact surface adjoining to the inner wall surface at aforesaid film pressure rib installation side in the slit are formed to be the continuous shape of circular arc, thus preventing the film from being bent to an acute angle even when the film is wound reversely around the spool core.

In order to provide a photographic film spool that enables a film to be wound around its spool core without any deformation of the film, in aforesaid spool according to the invention that is equipped with flanges on its both ends and with a through type slit that is formed at about the center of a spool core sandwiched between both flanges and is capable of taking in the tongue-shaped end of a film, a protrusion whose height is equal to or slightly lower than the circumferential portion inside aforesaid flanges is provided for the prevention of film deformation in the early stage of film winding, at the outside area of the slit forming portion in the manner that the protrusion and the slit cross at right angles.

BRIEF DESCRIPTION OF THE DRAWINGS

FIGS. 1-4 show an example of the present invention and FIG. 1 is a perspective view showing the state wherein the tongue-shaped end of a film faces correctly the slit f a spool.

DETAILED DESCRIPTION OF THE INVENTION

Referring now in detail to one of the embodiments of this invention illustrated in FIGS. 1 through 4, this invention will be described below.

Figure 1:
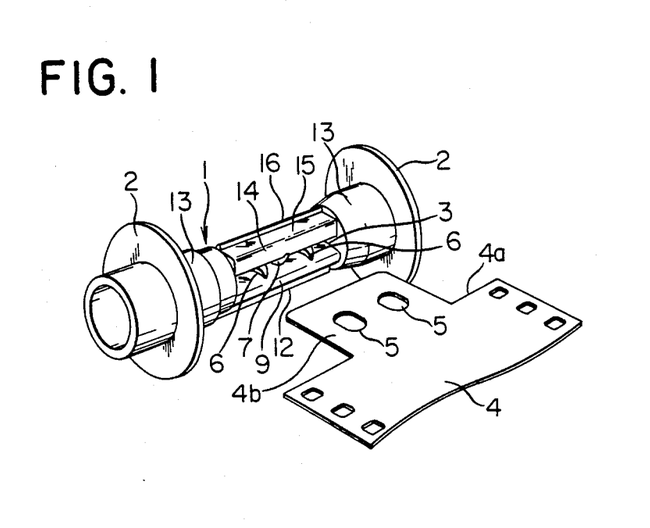
Figure 2:
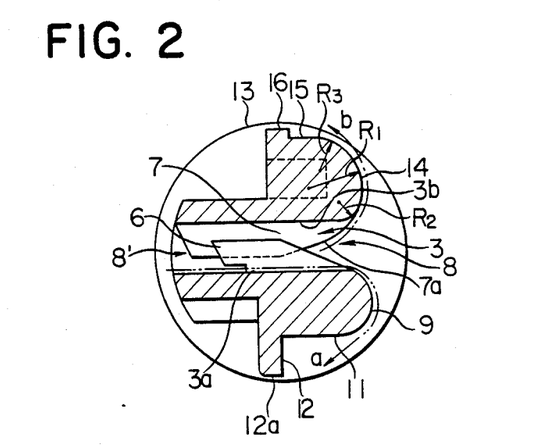
FIG. 2 is an enlarged sectional view of a slit forming section.

In FIG. 1, reference numeral 1 is a spool core having, at its both ends, flanges 2, 2, and 3 is a through type slit provided at about the center of spool core 1 between the flanges 2, 2. In slit 3, as shown in FIG. 2, one of inner wall surfaces 3a is provided with catch claws 6 and 6 capable of catching two perforations 5 and 5 juxtaposed in the direction of the width of tongue-shaped end 4b provided to edge 4a of film 4 and the other inner wall surface 3b of slit 3 is provided with film pressure rib 7 at the center between the above-mentioned two catch claws 6 and 6 so as to face the claws. The edges of these catch claws 6 and pressure rib 7 are slanted upward gradually from film inlet 8 toward opposite side 8' and perspective sectional views of these catch claws 6 and film pressure rib overlap each other as shown in FIG. 2. When inserting tongue-shaped end 4b of the film from film inlet 8 to the inside, then perforations 5 on tongue-shaped end 4b are engaged with catch claws 6. After that, when the film is slightly pulled in the direction opposite to that of insertion, the perforations are caught by the claws so as not readily to be disengaged from each other.

Numeral 9 is a film contact surface continuously connected to inner wall surface 3a of the slit on the side to which the above-mentioned catch claws are provided. When winding up film 4 having tongue-shaped end 4b caught in slit 3 in the regular direction (as shown by a two-dot chain line with arrow mark 'a' in FIG. 2), film contact surface 9 serves as the portion by which the film is curved for the first time. Therefore, film contact surface 9 is shaped into a circular arc so as not to fold the film and is further extended to lower surface 1! of the slit forming portion.

Numeral 14 is a film contact surface continuously connected to inner wall surface 3b of slit 3 on the side to which the above-mentioned pressure rib 7 is provided.

As mentioned before, this film contact surface 14 is a portion against which the surface of a film hits after traveling about once around spool core 1, when winding up film 4 whose tongue-shaped end 4b is caught in slit 3 in the regular direction. If the film is erroneously wound in the direction opposite to the regular direction (as shown by a two-dot chained line with arrow mark 'b' in FIG. 2), the film contact surface 14 is the portion where the film is bent for the first time.

Therefore, this film contact surface 14 is formed to be a continuous circular arc together with the surface of outer edge 7a at the film inlet side on the above-mentioned pressure rib 7 so as not to bend a film to an acute angle. It is preferable that the radius of curvature of the circular arc of film pressure rib 7 and the radius of curvature $R_1$ of film contact surface 14 are the same or nearly the same to each other and that these radiuses (2.4 mm in this example) are greater than the value obtained from Wedge Brittleness Test {Ref. No. ISO 6077 - 1980(E)} made at a low temperature. The reason for the above is that neither place nor time of taking pictures with a photographic film loaded in a camera can be specified and, if a film is accidentally wound up in the reverse direction at a low temperature, the film originally having a roll orientation set curl in the regular direction will be folded in the opposite direction to an acute angle, which causes troubles such as a crack or cut of a film. These troubles need to be prevented effectively.

Radius $R_2$ (1.0 mm in this example) of the intersecting point of film contact surface 14 and inner surface 3b of slit 3 is allowed to be smaller than that from the above-mentioned brittleness tests, because any film reversely wound up is not directly bent at the intersecting point with radius $R_2$. In particular, there is not any problem such as breaking film and so forth even if the radius (1.4 mm in this example) of film contact surface 9 on the side of catch claw 5 which will hit against a film when winding up the film in the regular direction is smaller than the value obtained in the above-mentioned tests, because the film itself has the original roll orientation set curl in the regular direction.

As described above, in a photographic film spool having a through type slit provided at about the center of a spool core and capable of taking in the tongue-shaped end of a film, catch claws provided on an inner wall at one side of the slit and capable of catching perforations made on the tongue-shaped end of the film and a film pressure rib provided on an inner wall at the other side of the slit, this invention is characterized in that both of the outer surface at the film inlet side on the film pressure rib and the film contact surface continuously connected to the inner wall surface of the slit on the side where the pressure rib is provided are formed to be a continuous circular arc. Therefore, this invention can display such an excellent effect that there is no risk of breaking film, even in case that the film is reversely wound around a spool core at a substantially low temperature.

Figure 3:
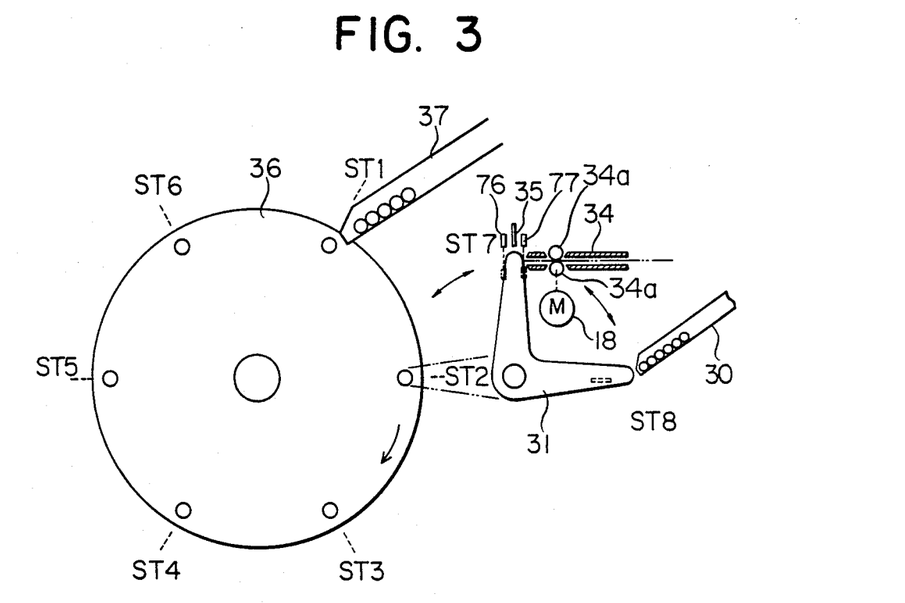
FIG. 3 is a schematic diagram showing a device for film winding and for loading the wound film into a magazine.

Next, the outline of the steps wherein a photographic film is wound around a spool according to the invention and the spool having therearound the photographic film is loaded in the film magazine. In FIG. 3, the numeral 30 is a spool supplier. 31 is a spool-holding arm and 34 is a film-guide chute. The spool, being held by the spool-holding arm 31 (ST 8). is moved from the spool supplier 30 to the vicinity of the tip of the film guide chute and is set there (ST 7) when the spool-holding arm 31 makes a turn of a prescribed angle. Around the spool set at the prescribed position in the ST 7, the film fed to the tip of the film-guide chute and with the help of its guide is wound. The numeral 37 is a magazine supplier and 36 is a disc on which work stations for a magazine are allocated. At the position of ST 1, a magazine is moved from the magazine supplier 37 to the disc 36 to be set there. The spool or scroll around which the film is wound at the position of ST 7 as stated above, after the further rotation of the spool-holding arm 31, is loaded in the magazine held on the disc 36 at the position of ST 2. In the arrangement of this invention, the disc 36 makes a turn of a prescribed angle, being synchronized with a movement of the spool-holding arm 31. Incidentally, the station of ST 3 on the disc 36 is for making sure that the spool or scroll is loaded properly in the magazine, ST 4 is for mounting a magazine cap and ST 5 is for delivering the magazine. Relating to above stations, the spool of the invention is arranged as follows.

Figure 12:
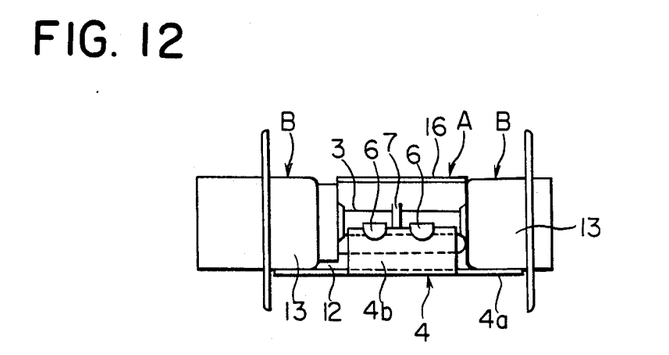
FIG. 12 represents an improvement wherein the spool shown in FIG. 13 has been improved.

As shown in FIG. 2, the reference numeral 12 represents a protrusion provided on the bottom surface 11 of the slit-forming portion in the manner that the protrusion and slit 3 cross at right angles. This protrusion 12 functions, when the spool supplied from spool supplier 30 to an end of spool-holding arm at the position of ST 8 as shown in FIG. 3 is rotated by rubber roller 32 as shown in FIG. 4A, as a stopper which causes the spool to hit the tip of positioning means 33 so that the slit may be positioned vertically. The film inlet 8 of the spool subjected above positioning faces correctly the film guide chute 34 when the spool holding arm 31 rotates through 90 deg and its tip arrives at the position of ST 7. Further, the height of the tip 12a of protrusion 12 is made to be equal to or slightly lower than those of the top surfaces of circumferential portions 13 and 13 located between aforesaid flanges 2 and 2 (a radius passing through the tip 12a of protrusion 12 is equal to or slightly smaller than that of circumferential portion), thereby it is possible to prevent, as shown in FIG. 12, the deformation of film which may otherwise be caused when the film is wound.

Figure 4:
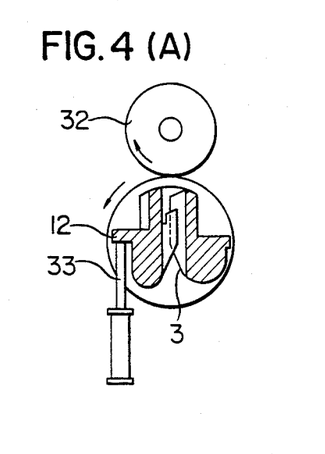
FIG. 4A is a sectional view showing the state wherein the spool is positioned in the spool supplying section and FIG. 4B is a sectional view showing the state of checking the facing direction of the slit in the film winding section.

The film contact surface 14 on the side of slit where aforesaid film pressure rib is provided is tangentially connected to the flat portion 15 provided on the top surface of the slit-forming portion. This flat portion 15 serves, as shown in FIG. 3, as a light-irradiated surface for the light projector that checks, when the spool supplied from the spool supplier 30 to one of the tips of spool holding arm 31 at the position of ST 8 is conveyed to the position of ST 7, whether the film inlet 8 of the slit 3 provided on the spool core 1 of the spool faces correctly the film guide chute 32 or not as shown in FIG. 4 B. The radius $R_3$ of the intersecting point of aforesaid film contact surface 14 and the flat portion 15 only needs to be the one that forms the shape of a circular arc and connects aforesaid two portions tangentially. It is 1.5 mm in this example.

The numeral 16 is a protrusion provided in the axial direction of spool core 1 in a manner that the protrusion adjoins the flat portion 14 on the top face of aforesaid slit-forming portion, and the height of the protrusion 16 is equal to or slightly lower than that of the top face of circumferential portions 13 and 13 located between flanges 2 and 2 (a radius passing through the tip of protrusion 16 is equal to or slightly smaller than that of circumferential portion), thereby it is possible to prevent effectively, as stated above, the deformation of film which may otherwise be caused when the film is wound reversely.

As stated above, in a photographic film spool having flanges at its both ends and a through type slit that is capable of taking in aforesaid tongue-shaped end of film, formed at about the center of a spool core between both flanges and is equipped with a catching means for aforesaid tongue-shaped end of film, the present invention is characterized in that the protrusion whose height is equal to or slightly lower than the circumferential portion inside aforesaid flanges is equipped on the upper side or the lower side of slit forming portion in the manner that the protrusion and the slit cross at right angles. Therefore, the difference of radius between the slit forming portion and the circumferential portion inside the flanges becomes zero or very small. Differing from the conventional spool which causes the deformation of film when the film is wound around the spool core after the tongue-shaped end of film is caught in the slit, the spool according to the invention has an excellent effect which prevents an accident that both corners at the end of the film are lifted by the deformation and scratch the emulsion surface of the film that is wound around the spool core by one turn.

As stated in the step where a film is wound around the spool, it is essential for the automation of this step, to provide a flat portion (e.g. portions indicated with 11 and 15 in FIG. 2) for positioning or position-detecting on the spool core. In this case, it is difficult to provide the sufficient circumferential length for film contact in the shape of a circular arc that is for preventing film damage caused by the reverse winding of film which is the first object of the invention. For this problem as stated above, it is possible to secure the sufficient length in the invention, because the film pressure rib in the slit is formed in the shape of a circular arc that is tangential to the film contact surface.

The foregoing is an explanation on the form (a circular arc) in the circumferential direction of a film contact surface, and the shape in the axial direction of the film contact surface will be stated as follows.

According to the results of the tests made by the inventors of the invention, the film contact surface having the discontinuous shape in the sectional view in the axial direction, instead of the film contact surface formed in a belt shape continuously along the entire length in the axial direction as shown in FIG. 1, may also give the film damage prevention effect similar to that of the example in FIG. 1.

Figure 7:
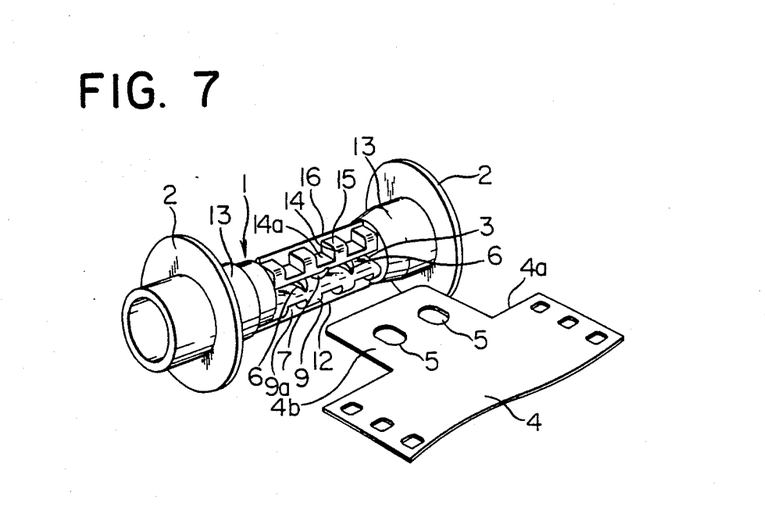
FIG. 7 and FIG. 8 show respectively the improvements wherein each of the spools shown in FIGS. 1–2 is provided with a groove for preventing the shrink mark.
Figure 8:
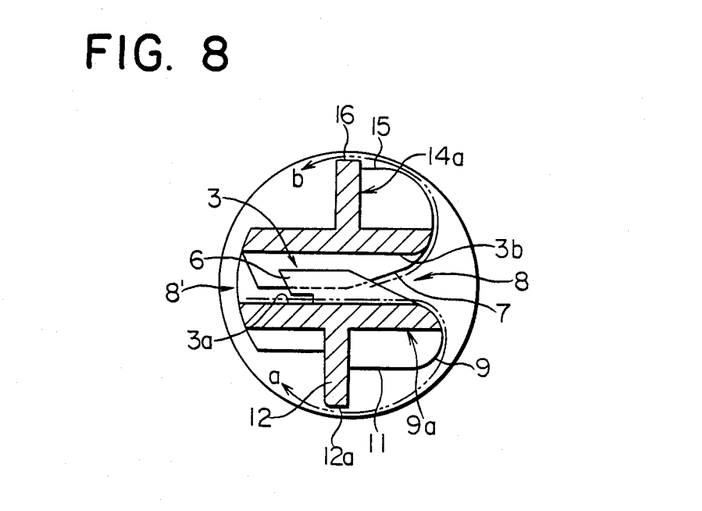

In the example of the invention shown in FIG. 7, it is possible to prevent the 'shrink mark' caused by an excessive thickness of the spool made by injection molding.

Figure 10:
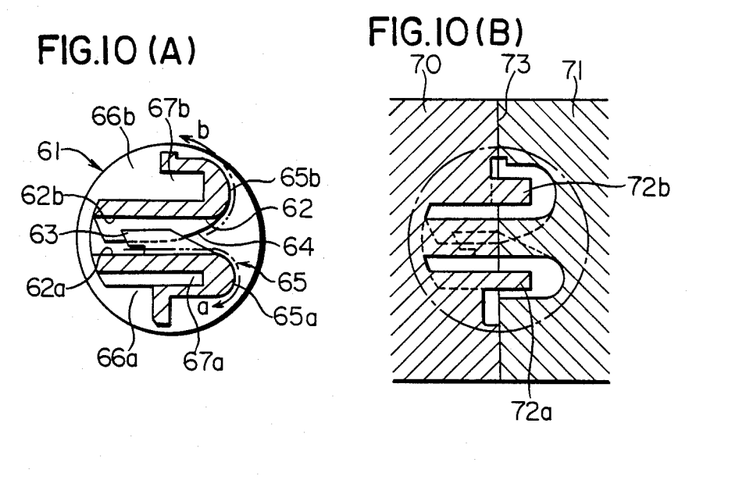
FIG. 10A is a sectional view of a spool before the improvement and FIG. 10B is a sectional view of the metal mold for injection molding for the spool before the improvement.

As shown in FIG. 10-A, when the film contact surface is formed in the shape of a circular arc in order to prevent the film from being folded in acute angle when the film is wound accidentally in the direction opposite to the regular direction, the upper and lower parts in the slit forming portion tend unavoidably to be thick and these thick portions tend to cause a shrink mark when the spool is made of plastic by injection molding. Therefore, it has been constituted so that cut portions 66a and 66b are provided on the opposite sides of film contact surfaces 65a and 65b respectively at both sides of the slit forming portion and shrink mark prevention holes 67a and 67b are further provided in the direction from the cut portions 66a and 66b to the film contact surfaces 65a and 65b respectively.

Figure 9:
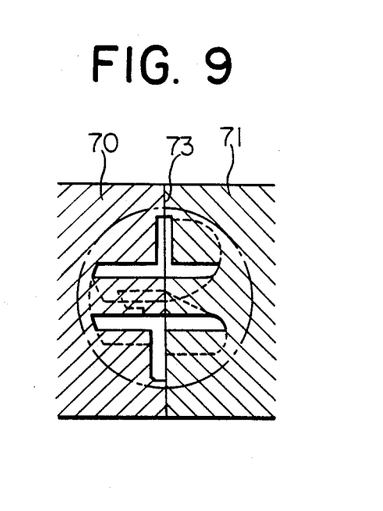
FIG. 9 is a sectional view of the metal mold for injection molding used for an injection molding machine and has been improved by the present invention.

For this purpose, as shown in FIG. 10B, mold 70 that is one of the molds 70 and 71 to be used in an injection molding machine has been equipped with protrusions 72a and 72b corresponding in position to aforesaid shrink mark prevention holes 67a and 67b respectively so that they protrude from their parting line between the molds 70 and 71, which has caused a mold to be complicated in structure, high in cost and short in life. Therefore, it is desirable, for the purpose of making the structure of a mold simple and preventing shrink marks, as shown in FIG. 7, to provide recess portions for the prevention of shrink marks on the upper or lower surface of the slit forming portion so that molds to be used in an injection molding machine may mate on their flat surfaces, as shown in FIG. 9. Namely, on the lower side of the film contact surface 9, there are provided a plurality (3 pieces in the figure) of recess portions 9a at a constant distance in the axial direction of spool core 1, as the measure for preventing shrink marks produced in injection molding. Aforesaid recess portions 9a for preventing shrink marks can be more fine or coarse than that in the example shown in the figure, but when making it more coarse, it is necessary to be in the range which allow no film to be deformed extremely when the film is wound.

Likewise, there are provided a plurality (3 pieces in the figure) of recess portions 14a at a constant distance in the axial direction of spool core 1 on the upper side of the film contact surface 14, as the measure for preventing shrink marks produced in injection molding. The conditions for the recess portions 14a for preventing shrink marks are the same as those for aforesaid recess portions 9a for preventing shrink marks.

In the present example, the lower side of the film contact surface 9 connected tangentially to one internal wall of the slit 3 and the film contact surface 14 connected to other internal wall of the slit are formed to be the shape of a circular arc and, on the upper and lower sides thereof, there are provided recess portions 9a and 14a for preventing shrink marks. As shown in FIG. 9, therefore, the parting line 73 that is a mating surface between molds 70 and 71 may be formed to be flat. This recess portion for preventing shrink marks may sometimes be provided only on the film contact surface on one side. It is desirable, in this case, that the recess portion is formed only on the side of film contact surface 14 connected to the upper side of the slit forming portion, namely, to the side where the film pressure rib is provided, where the thickness tends to be thick.

As stated above, in a photographic film spool having flanges at its both ends and a through type slit that is capable of taking in a tongue-shaped end of film, formed at about the center of a spool core between both flanges and is equipped with a catching means for aforesaid tongue-shaped end of film, the present invention is characterized in that the recess portions for preventing shrink marks are provided on the upper or lower side of aforesaid slit forming portion. Therefore, the parting line of molds for the spool to be used in an injection molding machine may be formed to be flat, which gives excellent effects such as the simple mold structure, the low mold cost, and the long mold life for the usage for a long period of time.

Figure 6:
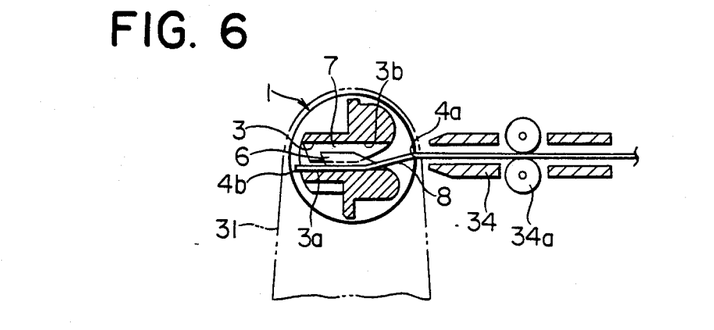

In aforesaid steps, as shown in FIG. 6, when the tongue-shaped end of film is to be caught in a spool, the spool needs to be held by means of holding member 31 so that the film inlet 8 of the slit 3 faces correctly to the film guide chute 34 and the feeding roller 34a positioned half way of the chute 34 needs to be driven so that the tongue-shaped end of film 4b is inserted into the slit 3 from its film inlet 8. In this case, the tongue-shaped end of film 4b is pushed toward the catch claw side by the pressure of aforesaid film pressure rib 7. Therefore, right after the holes provided on the tongue-shaped end of film are positioned correctly to the catch claws, they immediately engage with each other. This engagement may be ascertained tentatively by means of the detection of the load produced when the film end 4a, to where the tongue-shaped end of film is connected, hits the spool core 1 of the spool. This ascertainment causes the film-winding shaft connected to the spool core of the spool to be rotated so that a film is wound.

In the above case, however, making sure whether the holes provided on the tongue-shaped end of film 4b are surely engaged with the catch claws 6 is performed by means of only above ascertainment which is not strict, because the detection of the load may equally be made even if the tongue-shaped end of film is not inserted correctly in the slit (e.g. due to deformation of the tongue-shaped end of film in the slit, insufficient insertion of film, or film protruding from the slit etc.). Such erroneous insertion of the tongue-shaped end of film is needed to be detected before the start of film winding.

In order to provide an ascertaining device capable of checking when the tongue-shaped end of film is inserted into the slit of a spool, whether it is inserted correctly or not, therefore, the present invention provides a holder in which a spool whose spool core is provided with a through type slit having therein a catching means for the tongue-shaped end of film is held so that the film inlet side of its slit faces correctly the film guide chute, and the ascertaining device is equipped with the first sensor and the second sensor both provided in the vicinity of aforesaid holder. The first sensor detects the end of the tongue-shaped end of film which is inserted into aforesaid slit and has passed through the slit and the second sensor detects the film end from where the tongue-shaped end of film is extended, so that the insertion of the tongue-shaped end of film may be checked from both sides in the direction of film insertion in the slit.

Figure 5A:
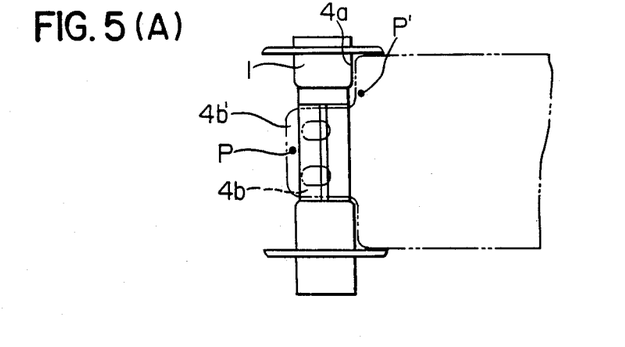
FIG. 5A is a top view showing detecting points of the first and second sensors.
Figure 5B:
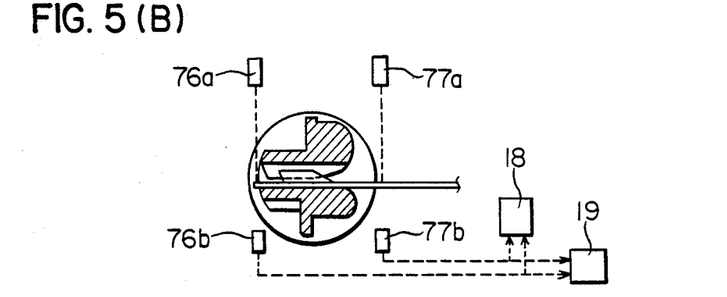
FIG. 5B is a schematic diagram illustrating the detecting state of the first sensor as well as that of the second sensor and FIG. 6 is a schematic diagram showing the state wherein a film is inserted into the slit from the film guide chute.

Namely, in FIG. 3, 76 and 77 represent respectively the first sensor and the second sensor arranged in the vicinity of the spool-holding arm 31 that is in the position of ST 7. The first sensor 76 is for detecting, at the point shown with black point P in FIG. 5A, the end of the inserted portion 4b' that is a position of the tongue-shaped end of film 4b fed out by the film feeding roller 34a located on the half way of the film guide chute 34 and has passed through the slit 3, and the second sensor 77 is for detecting, at the point shown with black point P' in the same figure, the state of film end 4a hitting the spool core 1 of the spool. As shown in FIG. 5B, the first sensor 76 and second sensor 77 are the combination of light emitting elements 76a and 77a and photoreceptor elements 76b and 77b both facing each other across a film passing plane, and as stated above, when no outputs are produced from both photoreceptor elements 76b and 77b due to no detection of the light from light emitting elements 76a and 77a intercepted by the portions shown with black points P and P' of film, the driving source 18 for the film feeding roller 34a that feeds a film through the film guide chute 34 stops the feeding operation and then concurrently with that, the driving source 19 for the film winding shaft (not shown in the figure)

that rotates the aforesaid spool core starts the winding operation.

As explained above, the present invention is characterized in its constitution that there are provided a holder in which a spool whose spool core is provided with a through type slit having therein a catching means for the tongue-shaped end of film is held in a manner that the film inlet side of its slit faces correctly the film guide chute, and the first and the second sensors both provided in the vicinity of aforesaid holder and detect respectively the end of the tongue-shaped end of film which is inserted into aforesaid slit and has passed through the slit and the film end from where the tongue-shaped end of film is extended. Therefore, it is possible to make sure easily, through the sensors, whether the tongue-shaped end of film is correctly inserted into the slit or not and it is further possible, when any one of the sensors detects no existence of film, to confirm the troubles such as an occasion that the tongue-shaped end of film is deformed in the slit, the film is inserted insufficiently, the film is extruded from the slit, or the film is not caught in the slit, which gives an excellent effect that optimum measures such as the suspension of the operation of a machine and others may be taken before advancing to the next step.

We claim:

1. A spool for a photographic roll film, said spool comprising:
    a bar-shaped spool core having a lengthwise slit therein, said slit being adapted to accept the insertion of a film end, said film end being tongue-shaped and having a hole therethrough,
    engaging means disposed on a first inside wall of said slit for arresting the tongue-shaped end of the film by engaging the hole,
    a pressing rib disposed on a second inside wall of said slit opposite the first inside wall, said pressing rib pressing and guiding the tongue-shaped end of the film so as to cause engagement with said engaging means, and
    an outer surface of said spool core, said outer surface comprising;
    a film contact surface adjoining a surface of the second inside wall, said film contact surface and a tipped surface of said pressing rib jointly forming a continuous circular arc.

2. The spool of claim 1 wherein said outer surface further comprises a flat surface parallel to the first and second inside walls of said slit, said flat surface setting a position of said spool during winding of said film.

3. The spool of claim 2 wherein flanges are provided at both sides of said spool core, said flanges joining said spool core at a top surface of a circumferential portion of said spool core and a protrusion on said flat surface for raising the height of said flat surface to be substantially equal to that of said top surface.

4. The spool of claim 1,
    wherein the radius of curvature of said pressing rib is substantially same with that of said film contact surface.

5. The spool of claim 1,
    wherein said slit is formed to pass through said spool core.

6. The spool of claim 1,
    wherein said engaging means is shaped in a form of catch claws, and
    wherein there are provided at least two pieces of said catch claws on the inside wall of said slit.

7. The spool of claim 1,
    wherein there are provided two pieces of said catch claws, and
    wherein said pressing rib is arranged to locate at a center position between two pieces of said catch claws.

8. The spool of claim 1,
    wherein said film contact surface of said spool core is slitted widthwise.

* * * * *